E. E. GOLD.
SAFETY POSITIVE LOCK FOR HOSE COUPLINGS.
APPLICATION FILED SEPT. 14, 1920.
1,395,273.
Patented Nov. 1, 1921.
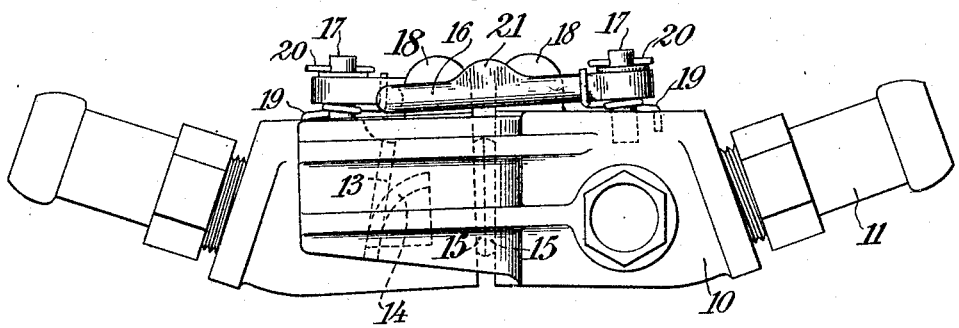
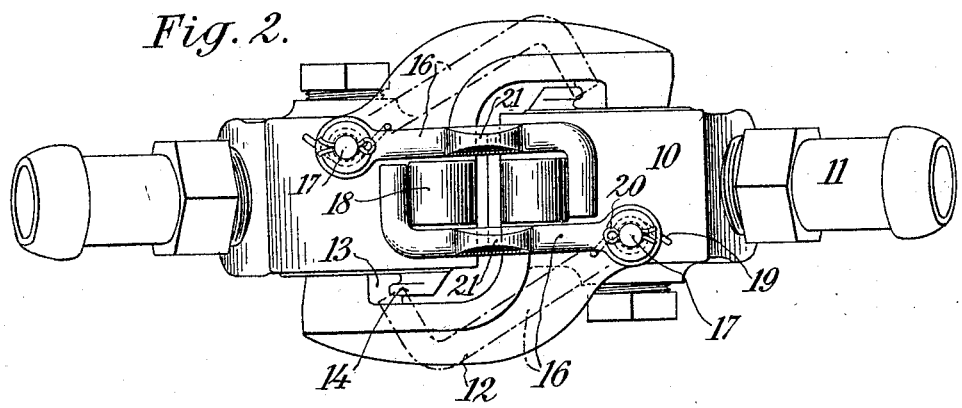
Inventor
Edward E. Gold,
By his Attorneys,
Fraser, Durk & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

SAFETY POSITIVE LOCK FOR HOSE-COUPLINGS.

1,395,273.  Specification of Letters Patent.  Patented Nov. 1, 1921.

Application filed September 14, 1920. Serial No. 410,266.

*To all whom it may concern:*

Be it known that I, EDWARD E. GOLD, a citizen of the United States of America, residing in the borough of Manhattan, city, county, and State of New York, have invented certain new and useful Improvements in Safety Positive Locks for Hose-Couplings, of which the following is a specification.

This invention relates to improvements in hose couplings, and more particularly to a safety positive lock, to prevent accidental disconnection of the same.

The invention is especially adapted for use as means for connecting the usual train pipe, or other hose commonly used on railroad trains, but is not limited, in its application, to such particular use.

The invention is herein disclosed as applied to a coupling of the well-known Gold straight port, gravity type, one example of which is illustrated in my prior Patent No. 913,950, of March 2, 1909.

Couplings of this type comprise reciprocal coupling members, each comprising a head connected to the train pipe by a section of flexible hose or piping. For connection to each other, each head is provided with a locking arm, to engage a locking projection on the head with which it is paired, the connection being effected by lifting the opposed ends, and then lowering them into their engaging relation by relative movement involving a partial rotation of each coupling member with respect to the other, in a manner well known to those skilled in the art. The relation of the locking arms and projections is such that the weight of the coupling members tends to hold them locked together in their engaged relation, and they may only be disengaged by being lifted and partly rotated, one with respect to the other, in directions opposite to the relative movements by which they are connected.

It has been found by experience, however, that unless some means is provided to prevent the disconnection of the couplings when in use, they are likely to be tossed or thrown upwardly, as a result of the train motion, and partly or entirely disconnected, one from the other. Attempts to provide locking means for this purpose, which shall be positive in operation, have frequently resulted in more or less complicated devices, involving the manipulation of wedges, bolts, screws, etc., requiring considerable time and inconvenience in their operation.

It is one of the objects of the present invention to provide a safety locking device for a coupling of the above-described type, which shall be simple, and, therefore, inexpensive in its construction, but which will afford an absolute and positive lock, and yet be capable of separation by a simple movement of the locking members.

In the accompanying drawing, illustrating one form of the invention,

Figure 1 is a side elevation of the coupling, showing the coupling members in their attached relation.

Fig. 2 is a plan view of the same, the position of the locking elements, when disconnected, being indicated in broken lines.

The invention, as herein disclosed, comprises a pair of mated coupling members, each comprising a head or body portion 10 and a neck portion 11, adapted for connection with the train pipe through the intermediary of a flexible section of hose or pipe. Each coupling member is provided with the usual locking arm 12, having an inwardly disposed flange 13, adapted for engagement with an outwardly projecting cam member or locking projection 14, carried by the opposed coupling member.

The above-described coupling members may be brought into their mutually engaged relation in a manner well known to those skilled in the art, by elevating the adjacent ends so as to bring each of the flanges 13 on the locking arms 12 above the corresponding cam member 14 of the opposed member. The coupling members are then lowered, and, at the same time, partially rotated, the right-hand member in a counter-clockwise direction, and the left-hand member in a clockwise direction, so as to bring each of the flanges 13 into engagement with the corresponding cam member 14, until the ends of the coupling members have become tightly pressed together, to form a close fitting joint. Suitable gaskets 15 may be provided, as usual, as a means for securing an absolutely tight fit, thus preventing leakage.

The parts thus far described are well known in the art, and constitute no part of the invention herein sought to be protected.

According to the present invention, there is provided, as a means for preventing accidental or unintentional separation of the coupling, due to the jolting or other movements of the cars when in motion, a safety positive lock, adapted to absolutely prevent the partial rotative movement, by which alone the coupling members may be separated, yet capable of being readily separated, by a simple manipulation of a pair of spring pressed locking elements. This lock, in the form herein disclosed, comprises, for each coupling member, an L-shaped locking element 16, pivotally mounted for rotation about a pin 17, extending vertically from its respective coupling member. Each of the coupling members is also provided with an upstanding lug 18, forming a keeper for the L-shaped locking element 16 of the opposed coupling member.

The locking element 16 may be provided with a spring 19, having one end engaging with an arm of the locking element, and the other end engaging the body portion of the coupling member. This spring serves as a means for moving the locking element 16 into its locking engagement with the keeper of the opposite coupling member, and constantly tends to maintain it in such position. Accidental displacement of the locking element from its bearing pin may be prevented by any approved means, such as a cotter pin 20.

The operation of the invention will be readily apparent. Since the separation of the coupling members may only be effected by a relative rotation of one member with respect to the other, about a turning point or fulcrum near the base of the coupling members, the L-shaped locking elements, when in engagement with the lugs 18, absolutely prevent such movement, and, therefore, afford a positive lock, irrespective of the springs by which they are maintained in this position. Since the locking elements may move with respect to the coupling members only about the vertical axes of the pins 17, there is no tendency to displace the same, as a result of vertical movements of the coupling members, by which alone they may become disconnected. The springs 19 afford means for preventing accidental jarring of the locking elements out of engagement with their keepers. The relation of the parts of the locking device is, therefore, such as to positively prevent accidental separation of the coupling members, yet the same may be readily separated, when desired, by merely moving the locking elements 16 outwardly about the pins 17 to the positions indicated in broken lines in Fig. 2. For this purpose, there may be provided, if desired, a thumb piece 21 for each locking element.

It is to be understood that the invention is not limited to the particular form herein illustrated and described, but that modifications and variations may be made, within the scope of the appended claims.

What I claim is:

1. A hose coupling, of the straight port, gravity type, comprising reciprocal coupling members, having each a head with a locking arm on one side and a locking projection on the opposite side, combined with a hook-shaped locking element pivoted to one of said members to swing about an upright axis, and a lug projecting upwardly from the other of said members to form a keeper, said locking element being movable into a positive locking engagement with said keeper.

2. A hose coupling, of the straight port, gravity type, comprising reciprocal coupling members, having each a head with a locking arm on one side and a locking projection on the opposite side, combined with a locking element pivoted to one of said members to swing about an upright axis, a keeper on the other of said members, and means for swinging said locking element about said axis into and normally tending to maintain it in positive locking engagement with said keeper.

3. A hose coupling, of the straight port, gravity type, comprising reciprocal coupling members, having each a head with a locking arm on one side and a locking projection on the opposite side, combined with safety locking mechanism, consisting of a locking element pivoted to one of said members, a keeper on the other of said members, said locking element being movable to a position of positive locking relationship with said keeper, whereby relative movement of said coupling members is prevented, and a spring device to move said locking element into its locking position, and normally tending to maintain it there.

4. A hose coupling, of the straight port, gravity type, comprising reciprocal coupling members, having each a head with a locking arm on one side and a locking projection on the opposite side, combined with a hook-shaped locking element pivoted to each of said members, each mounted to swing about an upright axis, and a lug projecting upwardly from each of said members, the lug of each member forming a keeper for the locking element of the other, each locking element being movable into a positive locking engagement with its respective keeper.

5. A hose coupling, of the straight port, gravity type, comprising reciprocal coupling members, having each a head with a locking arm on one side and a locking projection on the opposite side, combined with a locking element pivoted to each of said members, each mounted to swing about an upright axis, a keeper on each of said members, and means for swinging each of said locking elements about its axis into and normally tending to maintain it in positive locking engagement with its respective keeper.

6. A hose coupling, of the straight port, gravity type, comprising reciprocal coupling members, having each a head with a locking arm on one side and a locking projection on the opposite side, combined with safety locking mechanism, consisting of a locking element pivoted to each of said members, a keeper on each of said members, the respective locking element of each member being movable to a position of positive locking relationship with the keeper of the other, whereby relative movement of said coupling members is prevented, and a spring device for each of said locking elements to move the same into their locking positions, and normally tending to maintain them there.

In witness whereof, I have hereunto signed my name.

EDWARD E. GOLD.

Witnesses:
 HARRY C. POILLON,
 HARRISON T. PELHAM,
 LOUIS H. DREYER.